United States Patent
Kang et al.

(10) Patent No.: US 11,694,696 B2
(45) Date of Patent: Jul. 4, 2023

(54) METHOD AND APPARATUS FOR IMPLEMENTING SPEAKER IDENTIFICATION NEURAL NETWORK

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sungchan Kang, Hwaseong-si (KR); Namsoo Kim, Seoul (KR); Cheheung Kim, Yongin-si (KR); Seokwan Chae, Seoul (KR)

(73) Assignees: SAMSUNG ELECTRONICS CO.. LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 191 days.

(21) Appl. No.: 16/694,333

(22) Filed: Nov. 25, 2019

(65) Prior Publication Data
US 2020/0312336 A1    Oct. 1, 2020

(30) Foreign Application Priority Data

Mar. 25, 2019    (KR) .................. 10-2019-0033668

(51) Int. Cl.
*G10L 17/18*    (2013.01)
*G10L 17/04*    (2013.01)
(Continued)

(52) U.S. Cl.
CPC .............. *G10L 17/18* (2013.01); *G06N 3/045* (2023.01); *G06N 3/08* (2013.01); *G10L 15/07* (2013.01); *G10L 15/20* (2013.01); *G10L 17/04* (2013.01)

(58) Field of Classification Search
None
See application file for complete search history.

(56) References Cited

U.S. PATENT DOCUMENTS 10,410,114 B2    9/2019  Kang et al.
2015/0161522 A1*  6/2015  Saon .................... G06N 3/0454
                                                    706/12

(Continued)

FOREIGN PATENT DOCUMENTS

CN    111968679 A  * 11/2020
JP    2020134567 A *  8/2020

(Continued)

OTHER PUBLICATIONS

"Machine Translation of CN-109637546-A, Knowledge distillation method and apparatus, Apr. 2019, priority Dec. 29, 2018 , CN, Qian Y," (Year: 2019).*

(Continued)

*Primary Examiner* — Andrew C Flanders
*Assistant Examiner* — Jonathan Ernesto Amaya Hernandez
(74) *Attorney, Agent, or Firm* — Sughrue Mion, PLLC

(57) ABSTRACT

A method and apparatus for generating a speaker identification neural network include generating a first neural network that is trained to identify a first speaker with respect to a first voice signal in a first environment, generating a second neural network for identifying a second speaker with respect to a second voice signal in a second environment, and generating the speaker identification neural network by training the second neural network based on a teacher-student training model in which the first neural network is set to a teacher neural network and the second neural network is set to a student neural network.

17 Claims, 11 Drawing Sheets

(51) Int. Cl.
*G06N 3/08* (2023.01)
*G10L 15/20* (2006.01)
*G10L 15/07* (2013.01)
*G06N 3/045* (2023.01)

(56) References Cited

U.S. PATENT DOCUMENTS

| | | | | |
|---|---|---|---|---|
| 2015/0301796 | A1* | 10/2015 | Visser | G10L 15/22 715/728 |
| 2017/0287490 | A1* | 10/2017 | Biswal | G10L 17/22 |
| 2018/0040323 | A1* | 2/2018 | Lesso | G10L 25/90 |
| 2018/0190268 | A1* | 7/2018 | Lee | G10L 15/02 |
| 2018/0293988 | A1* | 10/2018 | Huang | G10L 17/20 |
| 2019/0051290 | A1* | 2/2019 | Li | G10L 25/30 |
| 2019/0156837 | A1 | 5/2019 | Park et al. | |
| 2019/0180741 | A1* | 6/2019 | Park | G10L 15/10 |
| 2019/0287515 | A1* | 9/2019 | Li | G10L 15/063 |
| 2019/0355366 | A1* | 11/2019 | Ng | G06N 3/0454 |
| 2020/0211566 | A1 | 7/2020 | Kang et al. | |

FOREIGN PATENT DOCUMENTS

| | | |
|---|---|---|
| KR | 10-1624926 B1 | 5/2016 |
| KR | 10-2017-0034258 A | 3/2017 |

OTHER PUBLICATIONS

Machine Translation of WO 2019062721 A1, Training Method For Voice Identity Feature Extractor and Classifier and Related Devices, Sep. 25, 2018, Wang J, (Year: 2018).*
"Albert Haque, Audio-Linguistic Embeddings For Spoken Sentences, Stanford University Department of Computer Science, pp. 1-5" (Year: 2019).*
Delcroix Marc, PE2E machine translation for JP 2020134567 A, Signal processing device, signal processing method and signal processing program, all pgs. (Year: 2019).*
"Peng, Emotion Recognition Method, Device, Electronic Device And Storage Medium, PE2E machine generated translation for CN 111968679 A, paragraph 6 of first embodiment, pp. 5-7, 2020" (Year: 2020).*
Georg Heigold et al., "End-to-End Text-Dependent Speaker Verification", 2016, 5 pages.
Sefik Emre Eskimez et al., "Front-end Speech Enhancement for Commercial Speaker Verification Systems", Speech Communication, Mar. 15, 2018, 37 pages.
Yingke Zhu et al., "Self-Attentive Speaker Embeddings for Text-Independent Speaker Verification", Interspeech 2018, Sep. 2, 2018, pp. 3573-3577.
Jinyu Li et al., "Developing Far-Field Speaker System via Teacher-Student Learning", 2018, 5 pages.

* cited by examiner

FIG. 7
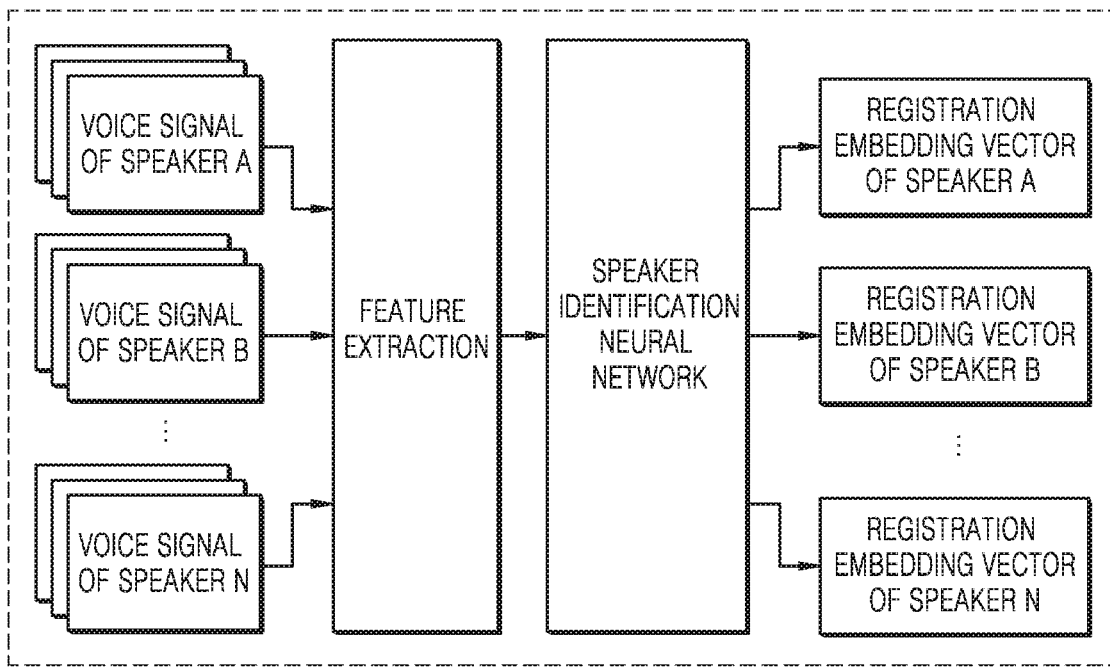
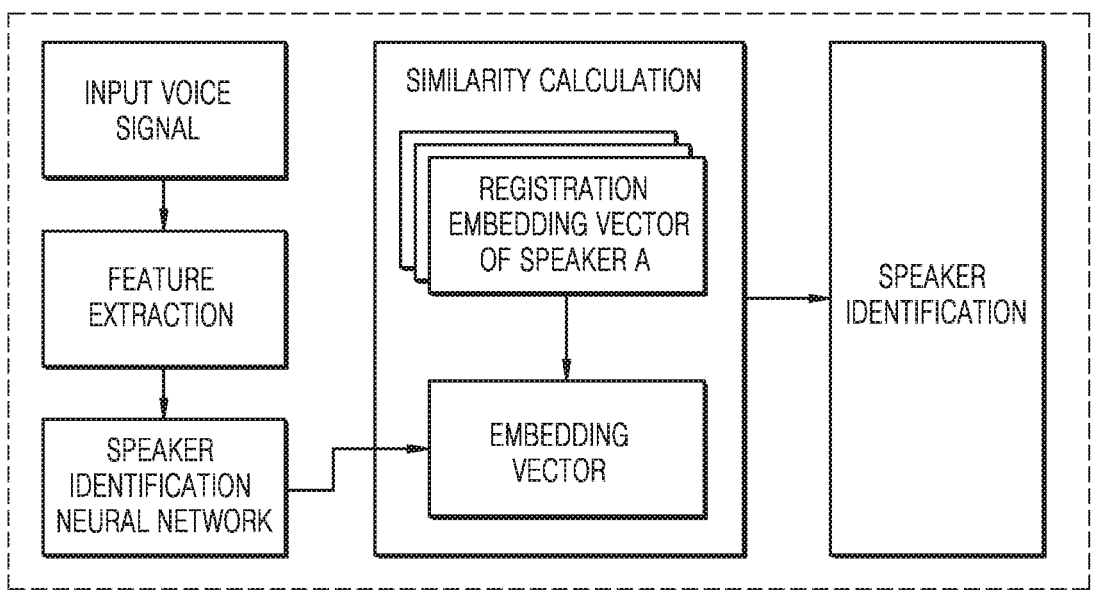

| 'Hi Bixby' | TRAINING DATA |
|---|---|
| NUMBER OF SPEAKERS | 160 (MEN 75, WOMEN 85) |
| NOISE TYPE | CAFE NOISE, AUTOMOBILE NOISE, CONSTRUCTION SITE NOISE, FACTORY NOISE, CHILD NOISE, ETC. (14 TYPES) |
| SIGNAL TO NOISE RATIO | -5, 0, 5, 10, 15, 20, 30 dB |
| UTTERANCES | 100 |

920

| | TESTING DATA |
|---|---|
| NUMBER OF SPEAKERS | 40 (MEN 18, WOMEN 22) |
| NOISE TYPE | AUTOMOBILE, BABBLE |
| SIGNAL TO NOISE RATIO | 5 dB |
| UTTERANCES | TARGET ATTEMPTS 60, NON-TARGET ATTEMPTS 60x39 |

930

| EER[%] | CLEAN ENVIRONMENT TRAINING (931) | NOISE ENVIRONMENT TRAINING (932) | TEACHER-STUDENT TRAINING MODEL (933) |
|---|---|---|---|
| INITIALIZATION | Xavier INITIALIZATION CONDITION | | FINAL VALUE OF FIRST NEURAL NETWORK |
| CLEAN + AUTOMOBILE & BABBLE NOISE | - | 4.7 | 3.7 |
| CLEAN | 3.2 | 4.5 | 3.6 |
| AUTOMOBILE NOISE | - | 4.3 | 3.6 |
| BABBLE NOISE | - | 5.1 | 4.4 |

METHOD AND APPARATUS FOR IMPLEMENTING SPEAKER IDENTIFICATION NEURAL NETWORK

CROSS-REFERENCE TO RELATED APPLICATION(S)

This application is based on and claims priority under 35 U.S.C. § 119 to Korean Patent Application No. 10-2019-0033668, filed on Mar. 25, 2019, in the Korean Intellectual Property Office, the disclosure of which is incorporated by reference herein in its entirety.

BACKGROUND

1. Field

The present disclosure relates to a method and apparatus for generating a speaker identification neural network, and implementing the generated speaker identification neural network.

2. Description of Related Art

A neural network refers to a computational architecture that models a biological brain. Recently, as neural network technology has developed, research is actively being carried out on analyzing input data and extracting valid information by utilizing a neural network in various kinds of electronic systems.

Neural networks may also be used in a voice recognition field or a speaker identification field with respect to voice signals. Neural networks may receive a voice signal, and may output a result indicating who a speaker is with respect to the voice signal through iterative training. In order to identify the speaker with respect to the voice signal, because a process for processing noise included in the voice signal and a process for distinguishing the speaker from the voice signal are involved, a technique for achieving high performance for both processes may be desired.

SUMMARY

Various embodiments are provided to provide a method and apparatus for implementing a speaker identification neural network. The technical solution of the present disclosure is not limited to the above-described technical problems, and other technical problems may be deduced from the following embodiments.

Additional aspects will be set forth in part in the description which follows and, in part, will be apparent from the description, or may be learned by practice of the embodiments.

A method of generating a speaker identification neural network includes generating a first neural network that is trained to identify a first speaker with respect to a first voice signal in a first environment in which a first signal-to-noise (SNR) value of the first voice signal is greater than or equal to a threshold value, generating a second neural network for identifying a second speaker with respect to a second voice signal in a second environment in which a second SNR value of the second voice signal is less than the threshold value, and generating the speaker identification neural network by training the second neural network based on a teacher-student training model in which the first neural network is set to a teacher neural network and the second neural network is set to a student neural network.

An apparatus for generating a speaker identification neural network includes a memory storing at least one program, and a processor configured to execute the at least one program to generate a first neural network that is trained to identify a first speaker with respect to a first voice signal in a first environment in which a first signal-to-noise (SNR) value of the first voice signal is greater than or equal to a threshold value, generate a second neural network for identifying a second speaker with respect to a second voice signal in a second environment in which a second SNR value of the second voice signal is less than the threshold value, and generate the speaker identification neural network by training the second neural network based on a teacher-student training model in which the first neural network is set to a teacher neural network and the second neural network is set to a student neural network.

An apparatus for identifying a speaker with respect to an input voice signal by utilizing a speaker identification neural network includes a memory storing at least one program, and a processor configured to extract a feature from the input voice signal, input the feature to the speaker identification neural network that is generated by training a second neural network according to a teacher-student training model in which a first neural network trained to identify a first speaker with respect to a first voice signal in a first environment in which a first signal-to-noise (SNR) value of the first voice signal is greater than or equal to a threshold value is set to a teacher neural network, and the second neural network for identifying a second speaker with respect to a second voice signal in a second environment in which a second SNR value of the second voice signal is less than the threshold value is set to a student neural network, extract an embedding vector corresponding to the feature from the speaker identification neural network, and identify the speaker with respect to the input voice signal based on the embedding vector.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram illustrating a specific example in which an apparatus for identifying a speaker with respect to an input voice signal operates by utilizing a speaker identification neural network according to an embodiment;

FIG. 9 is a diagram illustrating tables for explaining performance used to identify a speaker with respect to an input voice signal through a speaker identification neural network according to an embodiment;

DETAILED DESCRIPTION

Figure 1:
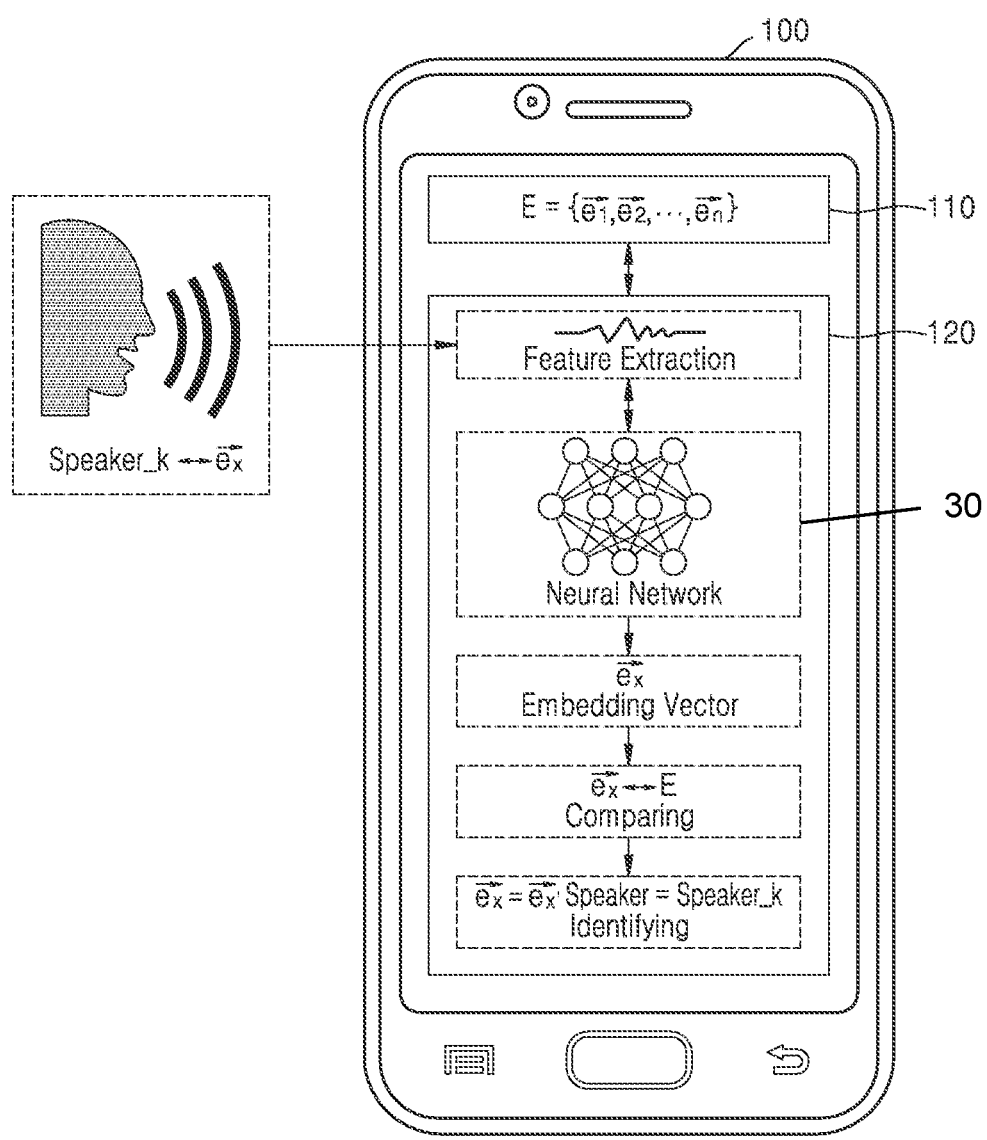
FIG. 1 is a diagram for explaining an operating process of an apparatus for identifying a speaker with respect to an input voice signal using a speaker identification neural network according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of the present disclosure will be described in detail with reference to the accompanying drawings. It is to be understood that the following description is intended to illustrate the embodiments and not to restrict or limit the scope of the disclosure. It is interpreted that those skilled in the art may easily deduce from the detailed description and the embodiments falls within the scope of the disclosure.

As used herein, the terms "comprising" or "including" and the like should not be construed as necessarily including the various elements or operations described in the specification, and it should be understood that some of the elements or some of the operations may not be included, or that additional elements or operations may be further included.

As used herein, terms including ordinals such as "first" or "second" may be used to describe various elements, but the elements should not be limited by the terms. The terms may be used for the purpose of distinguishing one element from another.

The terms used in the present specification are selected as general terms which are widely used in consideration of functions in the present disclosure, but these may vary depending on the intention of the person skilled in the art, the precedent, the emergence of new technology, or the like. Also, in certain cases, there may be a term arbitrarily selected by the applicant, in which case the meaning thereof will be described in detail in the corresponding description of the disclosure. Therefore, the term used in the present disclosure should be defined based on the meaning of the term, and the entire content of the present disclosure.

The present embodiments are directed to a method and apparatus for implementing a speaker identification neural network, and a detailed description of known matters to those skilled in the art may be omitted.

FIG. 1 is a diagram for explaining a process of operating an apparatus 100 for identifying a speaker with respect to an input voice signal using a speaker identification neural network 30 according to an embodiment.

Referring to FIG. 1, there is shown an example of a process in which speaker identification is performed in the apparatus 100 for identifying the speaker with respect to the input voice signal by utilizing the speaker identification neural network 30. Speaker identification may be performed by a memory 110 and a processor 120 included in the apparatus 100. Although the apparatus 100 is shown as a mobile apparatus in FIG. 1, this is merely an example, and the apparatus 100 is not limited to a mobile apparatus, and may include other types of electronic devices that may include the memory 110 and the processor 120.

A speaker may refer to a subject that generates a voice signal. For example, the speaker may be a user of the apparatus 100. However, the present disclosure is not limited thereto, and other persons other than the user of the apparatus 100, various animals capable of making sound, electronic devices capable of reproducing a recorded voice, and natural substances causing sound (e.g., waves, wind, or the like) may correspond to the speaker.

Identifying the speaker may refer to determining which speaker relates to the voice signal that is input to the apparatus 100. Speaker identification may include a process of recognizing that the input voice signal is not a random voice signal, and is instead a voice signal of a specific speaker, and a process of distinguishing which speaker is the specific speaker. Therefore, even when it is recognized that the voice signal input according to the speaker identification of the apparatus 100 is someone's voice, there may be a case where the speaker who has uttered the voice is not capable of being distinguished.

The apparatus 100 may further include a voice sensor that, in addition to the memory 110 and the processor 120, converts audible noise uttered by the speaker into the voice signal that the apparatus 100 is capable of processing. For example, the apparatus 100 may include a microphone as the voice sensor. The voice sensor may be of any type, such as a broadband microphone, a resonator microphone, and a narrowband resonator microphone array, or any other type that may be implemented within the apparatus 100 without limitation.

The speaker identification neural network 30 may be a neural network for identifying the speaker with respect to the input voice signal. The speaker identification neural network 30 may be trained to identify the speaker with respect to the input voice signal. Data relating to layers, nodes, etc. constituting the speaker identification neural network 30 may be stored in the memory 110, and the processor 120 may perform speaker identification through an operation on the data constituting the speaker identification neural network 30 stored in the memory 110. The details of a structure and an operation of the speaker identification neural network 30 will be described in more detail later with reference to FIG. 2.

The speaker identification neural network 30 may perform speaker identification based on an embedding vector. A last hidden layer of at least one layer constituting the speaker identification neural network 30 may be referred to as an "embedding layer," and the embedding vector may refer to an output of the embedding layer. Because voice signals of different speakers may be output as different embedding vectors, the processor 120 may identify who the corresponding speaker is from the embedding vector.

The utterances of the speaker may be converted into the voice signal by the voice sensor, and the processor 120 may convert the voice signal to a feature. The feature of the voice signal may be extracted from the voice signal through an operation such as Fourier transform, or the like. The speaker identification neural network 30 may be provided with the feature of the voice signal. The speaker identification neural network 30 may perform an operation on the input feature, and may output an embedding vector corresponding to the feature.

Speaker identification may be performed through comparison of the embedding vector with respect to the input voice signal and a previously stored embedding vector. To this end, an embedding vector with respect to at least one speaker may be previously stored in the memory 110 according to a separate registration procedure. The apparatus 100 may determine which voice of the at least one speaker relates to the input voice signal through comparison of the embedding vector with respect to the input voice signal and the previously stored embedding vector.

Speaker identification using the speaker identification neural network 30 may be performed after the speaker identification neural network 30 is generated through training. The speaker identification neural network 30 may be generated by training according to a teacher-student training model. The details of the formation of the speaker identification neural network 30 will be described in more detail later with reference to FIGS. 4 to 6.

After the speaker identification neural network 30 is generated, the apparatus 100 may utilize the generated neural network 30 to identify the speaker with respect to the input voice signal. As shown in FIG. 1, the apparatus 100 may receive an input voice signal based on an utterance of a speaker_k, the apparatus 100 may extract a feature from the input voice signal, and may input the feature into the speaker identification neural network 30. Further, the apparatus 100 may extract an embedding vector corresponding to the feature from the speaker identification neural network 30, and may compare the embedding vector with previously stored values corresponding to a speaker_1 to a speaker n. Further still, the apparatus 100 may identify that the embedding vector corresponds to the speaker_k as a result of comparison. Specific details of the apparatus 100 for identifying the speaker using the speaker identification neural network 30 will be described in more detail later with reference to FIGS. 7 and 8.

Figure 2:
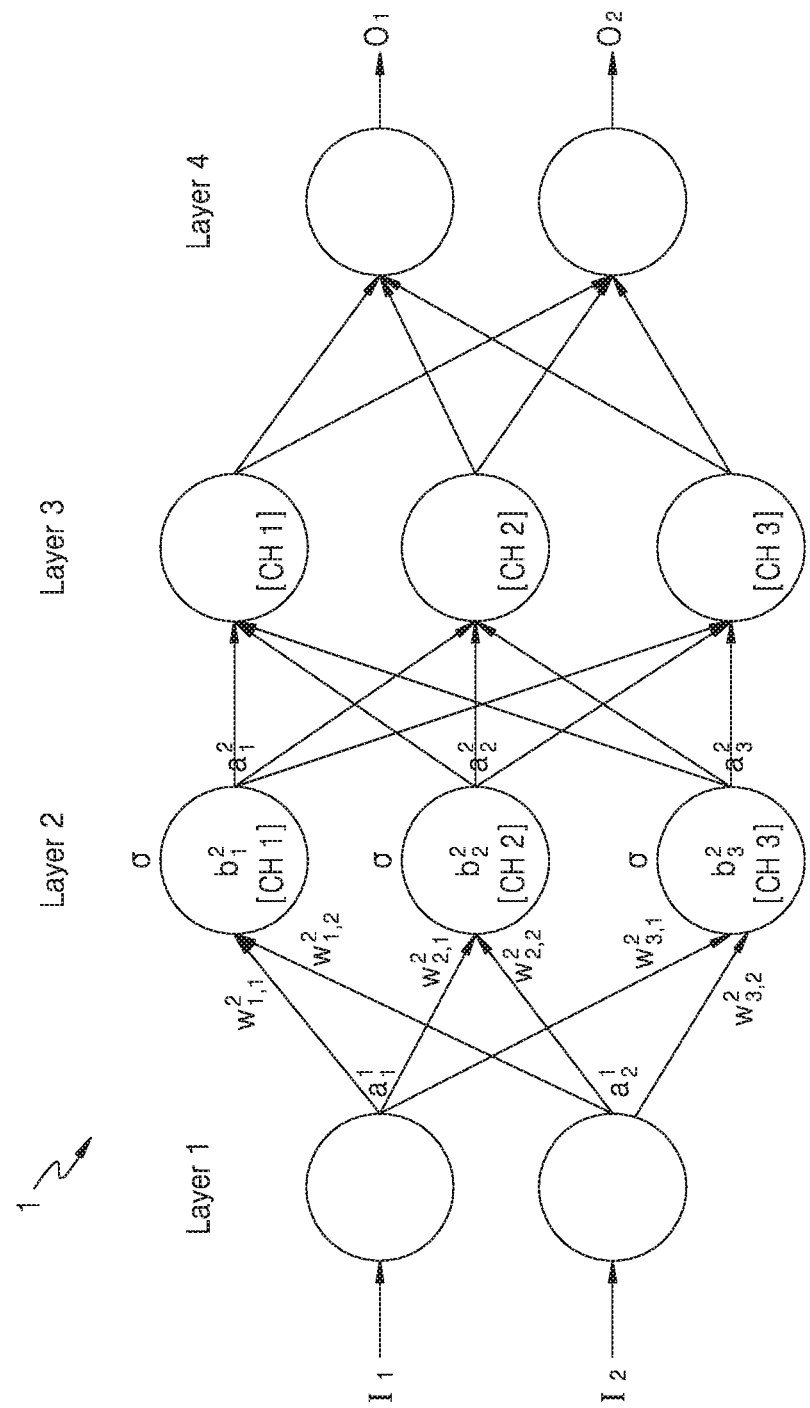
FIG. 2 is a diagram for describing operations performed in a neural network according to an embodiment.

FIG. 2 is a diagram for describing operations performed in a neural network 1 according to an embodiment.

Referring to FIG. 2, a structure in which an input layer (Layer 1), one or more hidden layers (Layer 2 and Layer 3), and an output layer (Layer 4) are included in the neural network 1 is shown. The neural network 1 may receive input data ($I_1$ and $I_2$), perform computation on the input data ($I_1$ and $I_2$), and generate output data ($O_1$ and $O_2$) based on an operation result.

The neural network 1 described with reference to FIG. 2 may be an example of the speaker identification neural network 30 generated by the apparatus 100 and utilized by the apparatus 100 to perform speaker identification. In addition, the neural network 1 may be an example of a first neural network 10 and a second neural network 20, which will be described in more detail later with reference to FIGS. 4 to 6. Therefore, the description of the operations performed in the neural network 1 may be applied equally to operations performed in the first neural network 10, the second neural network 20, and the speaker identification neural network 30.

The neural network 1 may be a deep neural network (DNN) or an n-layer neural network including two or more hidden layers. As shown in FIG. 2, because the neural network 1 may include the input layer (Layer 1), the two hidden layers (Layer 2 and Layer 3), and the output layer (Layer 4), the neural network 1 may be the DNN. In the case where the neural network 1 is implemented as the DNN, because a process of processing an operation on data may be further intensified, in contrast to a case where only a single layer is formed, the DNN may process more complicated data and operations. Although the neural network 1 is shown as including four layers, this is merely an example, and the neural network 1 may include fewer or more layers, and may include fewer or more channels. Therefore, the neural network 1 may include layers and channels of various structures different from the example shown in FIG. 2.

Each of the layers constituting the neural network 1 may include a plurality of channels. A channel may correspond to a neuron, a processing element (PE), a unit, or artificial nodes known as terms similar thereto. As illustrated in FIG. 2, the input layer (Layer 1) may include two channels (nodes), and the hidden layer (Layer 2) and the hidden layer (Layer 3) may each include three channels. However, this is merely an example, and each of the layers of the neural network 1 may include various numbers of channels (nodes).

The channels included in each of the layers of the neural network 1 may be connected to each other to process data. For example, any channel included in the neural network 1 may receive data from channels of a previous layer to perform computations, and output a computation result to channels of a subsequent layer.

An input of each of the channels may be referred to as "input activation," and an output of each of the channels may be referred to as "output activation." The activation of the channel may correspond to an output of the channel and a simultaneous input to a channel included in the subsequent layer. Any channel may receive inputs of activations of the channels included in the previous layer as inputs, and apply a weight to each of the input activations to determine and output its activation. The weight may refer to a parameter indicating a weight applied to the activations of the previous layer channels input to any particular channel and may be a value assigned to a connection relationship between the channels.

Each of the channels may be processed by a computational unit or a processing element that receives input and outputs output activations, and the input-output of each of the channels may be mapped. For example, when σ denotes an activation function, $w_{j,k}^i$ denotes a weight between a k-th channel included in an i−1th layer and a j-th channel included in an i-th layer, $b_j^i$ denotes a bias of a j-th channel included in the i−1th layer, and $a_j^i$ denotes an activation of the j-th channel included in the i-th layer, the activation $a_j^i$ may be calculated as shown in Equation 1 below.

$$a_j^i = \sigma\left(\sum_k (w_{jk}^i \times a_k^{i-1}) + b_j^i\right) \quad \text{[Equation 1]}$$

As illustrated in FIG. 2, $a_1^2$ may refer to an activation of a first channel CH1 of the hidden layer Layer 2. $a_1^2$ may be equal to $\sigma(w_{1,1}^2 * a_1^1 + w_{1,2}^2 * a_2^1 + b_1^2)$ according to Equation 1. However, Equation 1 is merely an example for explaining the weight, the bias, and the activation as parameters used for processing data in the neural network 1, but is not limited thereto. Activation may refer to a value obtained by passing a value to which an activation function is applied to a sum of the activations received from the channels of the previous layer to a rectified linear unit (ReLU).

The neural network 1 may be trained or generated to achieve a specific purpose. For example, when the input data ($I_1$ and $I_2$) is input to the neural network 1, the neural network 1 may be trained to output the previously set output data ($O_1$ and $O_2$) which correspond to the input data ($I_1$ and $I_2$). Training of the neural network 1 may be performed by updating the parameters of the neural network 1. For example, a value of the weight $w_{j,k}{}^i$ indicating the connection relationship between the nodes of the neural network 1 and a value of the bias $b_j{}^i$ reflected in a process of calculating the output of each of the nodes may be updated iteratively in a training process.

Updating of the parameters of the neural network 1 may be performed through backpropagation. Feed forward may be performed in which the input data ($I_1$ and $I_2$) is input to the neural network 1 to pass through the layers in a step by step manner, the output data ($O_1$ and $O_2$) is computed, and a difference between previously set training targets corresponding to the output data ($O_1$ and $O_2$) and the input data ($I_1$ and $I_2$) output as a feed forward result may be calculated. Thereafter, backpropagation may be performed in which the parameters such as the weight $w_{j,k}{}^i$ and the bias $b_j{}^i$ are corrected and updated such that a difference between a current output value of an output layer and the training target is reduced along a reverse direction from the output layer toward an input layer.

When feed forward and backpropagation are iteratively performed, the current output value of the output layer may be equal to the training target, and training may be completed by fixing the parameters such as the weight $w_{j,k}{}^i$ and the bias $b_j{}^i$ of the state. In case where training is completed, when the input data ($I_1$ and $I_2$) is input to the neural network 1, the same value as the previously set training target corresponding to the input data ($I_1$ and $I_2$) may be output from the output layer of the neural network 1.

The speaker identification neural network 30 may be generated through training. Specifically, the speaker identification neural network 30 may be formed by training according to a teacher-student training model. The teacher-student training model may refer to a model that trains a student neural network by referring to a teacher neural network that has already been trained. Generating of the speaker identification neural network 30 may be described in more detail later with reference to FIGS. 4 through 6.

Figure 3:
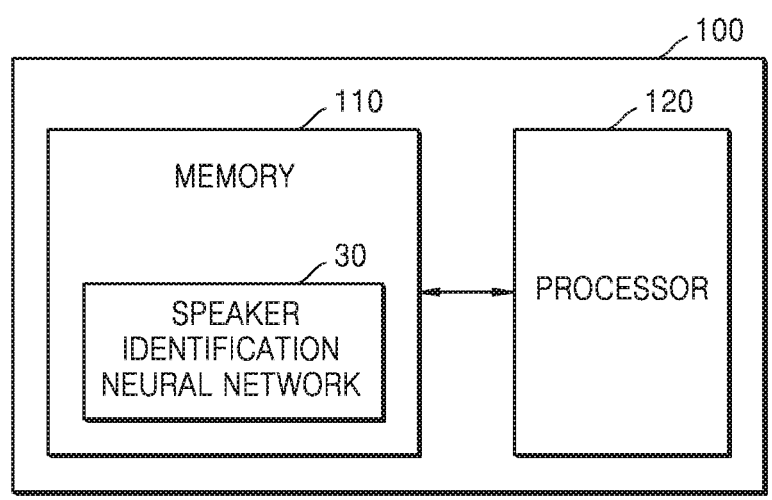
FIG. 3 is a block diagram illustrating elements constituting an apparatus that implements a speaker identification neural network according to an embodiment.

FIG. 3 is a block diagram illustrating elements constituting the apparatus 100 that implements the speaker identification neural network 30 according to an embodiment.

Referring to FIG. 3, the apparatus 100 that implements the speaker identification neural network 30 may include the memory 110 and the processor 120. However, the present disclosure is not limited thereto, and elements other than the elements shown in FIG. 3 may be further included in the apparatus 100.

The apparatus 100 may correspond to a computing apparatus having various processing functions such as a function of generating the neural network 1, training the neural network 1, or identifying a speaker of a voice signal using the neural network 1. For example, the apparatus 100 may be implemented as various types of devices, such as a PC (personal computer), a server apparatus, a mobile apparatus, and the like.

The memory 110 may be implemented in hardware that stores various data processed by the apparatus 100, and may store data processed and data to be processed by the apparatus 100. The memory 110 may store applications, drivers, and the like, that are to be driven by the apparatus 100. The memory 110 may be a dynamic random access memory (DRAM), but is not limited thereto.

The memory 110 may include at least one of a volatile memory or a nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FeRAM), and the like. The volatile memory may include DRAM, static RAM (SRAM), synchronous DRAM (SDRAM), PRAM, MRAM, RRAM, FeRAM, and the like. For another example, the memory 110 may include at least one of hard disk drive (HDD), solid state drive (SSD), compact flash (CF), secure digital (SD), micro secure digital (Micro-SD), mini secure digital (Mini-SD), extreme digital (XD), and a memory stick.

The memory 110 may store data relating to the speaker identification neural network 30. For example, the memory 110 may store data relating to layers and channels that constitute the speaker identification neural network 30, and the memory 110 may store weights between channels and a bias of each of the channels as parameters of the speaker identification neural network 30. When the speaker identification neural network 30 is being trained, the memory 110 may iteratively repeat the process of updating and storing the values of the parameters, and upon completion of the training, the memory 110 may store the values of the parameters as final values.

The processor 120 may be implemented as an array of a plurality of logic gates and may be implemented as a combination of a general purpose microprocessor and a memory in which a program executable in the microprocessor is stored. The processor 120 may include a plurality of processing elements. For example, the processor 120 may be implemented as a central processing unit (CPU), a graphics processing unit (GPU), an application processor (AP), or the like, provided in the apparatus 100, but is not limited thereto.

The processor 120 may perform an overall function for controlling the apparatus 100. The processor 120 may execute at least one program stored in the memory 110 to thereby control the overall operation of the apparatus 100 and process various computations performed by the apparatus 100. For example, the processor 120 may perform operations of generating the neural network 1 and training the neural network 1 by using programs and data stored in the memory 110, and implement the speaker identification neural network 30.

Meanwhile, the apparatus 100 of FIG. 3 may perform operations to generate the speaker identification neural network 30, and the apparatus 100 may utilize the completely generated speaker identification neural network 30 to perform operations to identify a speaker with respect to an input voice signal. Thus, generation of the speaker identification neural network 30 and speaker identification using the speaker identification neural network 30 may be performed by the apparatus 100.

Figure 4:
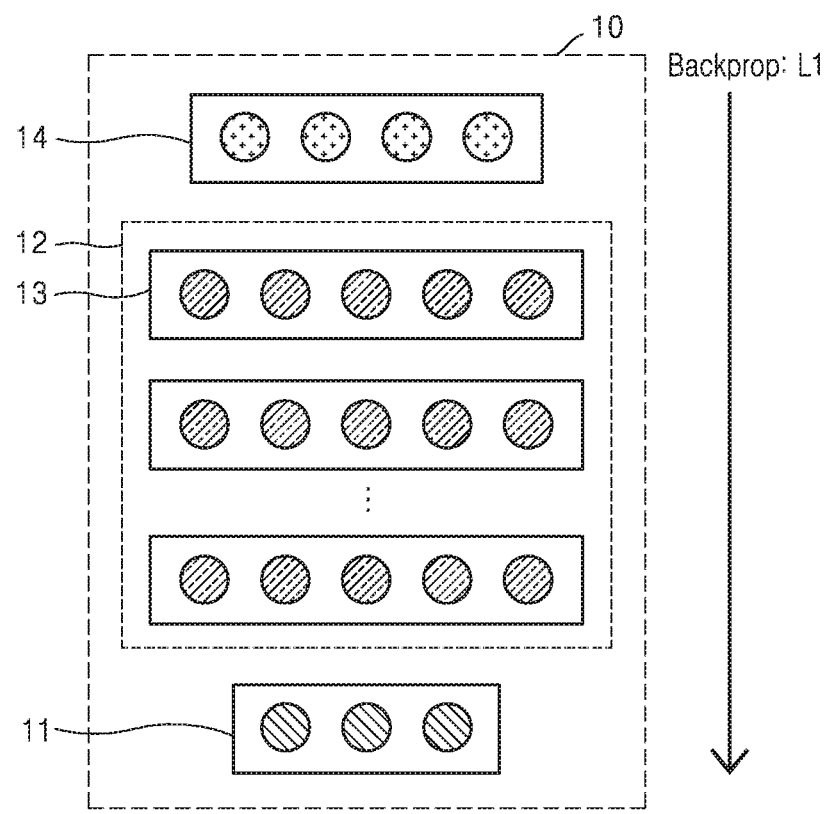
FIG. 4 is a diagram illustrating a process of generating a first neural network according to an embodiment.

FIG. 4 is a diagram illustrating a process of generating the first neural network 10 according to an embodiment.

Referring to FIG. 4, layers and channels that constitute the first neural network 10 are shown. As described above, the first neural network 10 may be another example of the neural network 1 of FIG. 2.

The processor 120 may generate the first neural network 10 that is trained to identify a speaker with respect to a voice signal in a clean environment. The voice signal in the clean environment may refer to a voice signal that includes substantially no noise or include noise of very low intensity. For example, the voice signal in the clean environment may be a voice signal having a signal to noise ratio (SNR) that is equal to or greater than a threshold value.

The first neural network 10 may include an input layer 11, hidden layers 12, and an output layer 14. The first neural network 10 may be a deep neural network (DNN) in which the hidden layers 12 include two or more layers. However, the present disclosure is not limited thereto, and the first neural network 10 may be implemented as another neural network structure such as a convolutional neural network (CNN), a recurrent neural network (RNN), restricted Boltzmann machine, or the like.

A final layer of the hidden layers 12 of the first neural network 10 may be an embedding layer 13. The embedding layer 13 may be a layer located immediately before an output layer 14, and an output of the output layer 14 may be determined based on a first embedding vector indicating an output of the embedding layer 13. The first embedding vector may have activations output from channels included in the embedding layer 13 as each component of the first embedding vector. The processor 120 may store data relating to the layers, channels, parameters, etc., of the first neural network 10 in the memory 110.

The processor 120 may generate the first neural network 10 through training using a deep learning method. Deep learning may refer to a process of iteratively updating training parameters using a plurality of layers. However, the present disclosure is not limited thereto, and the first neural network 10 may be trained according to another training method of identifying the speaker with respect to the voice signal in the clean environment.

The processor 120 may generate the first neural network 10 by minimizing a loss function. For example, the processor 120 may set a cross entropy between the output of the output layer 14 with respect to a specific input and a training target with respect to the specific input to the loss function, and the processor 120 may generate the first neural network 10 by repeating training until the cross entropy is minimized.

Specifically, the training target with respect to the specific input may be in the form of a one-hot vector, such as [1 0 ... 0], [0 1 ... 0], [0 0 ... 1] as a speaker label vector, and the processor 120 may repeat training until the cross entropy between the training target and the output with respect to the specific input is minimized and the output with respect to the specific input is in the form of the one-hot vector. When a voice signal of a clean environment of a specific speaker is input, the first neural network 10 generated through such training may output a one-hot vector indicating a label of the speaker to the output layer 14.

As shown in FIG. 4, a loss function L1 for generating the first neural network 10 may be the cross entropy between the training target and the output, and the processor 120 may iteratively perform backpropagation for the purpose of minimization of the loss function L1. The processor 120 may iteratively update the training parameters of the first neural network 10 by iteratively performing backpropagation. When the loss function L1 is minimized through repetition of backpropagation, the processor 120 may fix values of the training parameters and store the values in the memory 110, and thus training is completed and the first neural network 10 may be generated.

When training is completed and the first neural network 10 is generated, the speaker with respect to the voice signal of the clean environment may be identified based on the first embedding vector of the embedding layer 13. Because different values of the first embedding vector are output with respect to voice signals by different speakers, the processor 120 may identify the speaker with respect to the voice signal of the clean environment based on the first embedding vector.

The data for training the first neural network 10 may be a voice signal of the clean environment. Because the first neural network 10 is trained using the voice signal of the clean environment without considering an influence of noise, the first neural network 10 may have a high performance in terms of identifying the speaker associated with the voice signal. However, because the apparatus 100 might operate in a variety of noise environments, the processor 120 may generate the speaker identification neural network 30 in a manner that reinforces the ability to process noise while retaining high speaker identification performance of the first neural network 10.

A process of reinforcing the ability to process noise may be performed according to the teacher-student training model. For example, the first neural network 10 with high speaker identification performance may be set to a teacher neural network, and a student neural network may perform additional training regarding noise processing after adopting the high speaker identification performance of the teacher neural network. A detailed description of the teacher-student training model may be provided later with reference to FIGS. 5 and 6.

Figure 5:
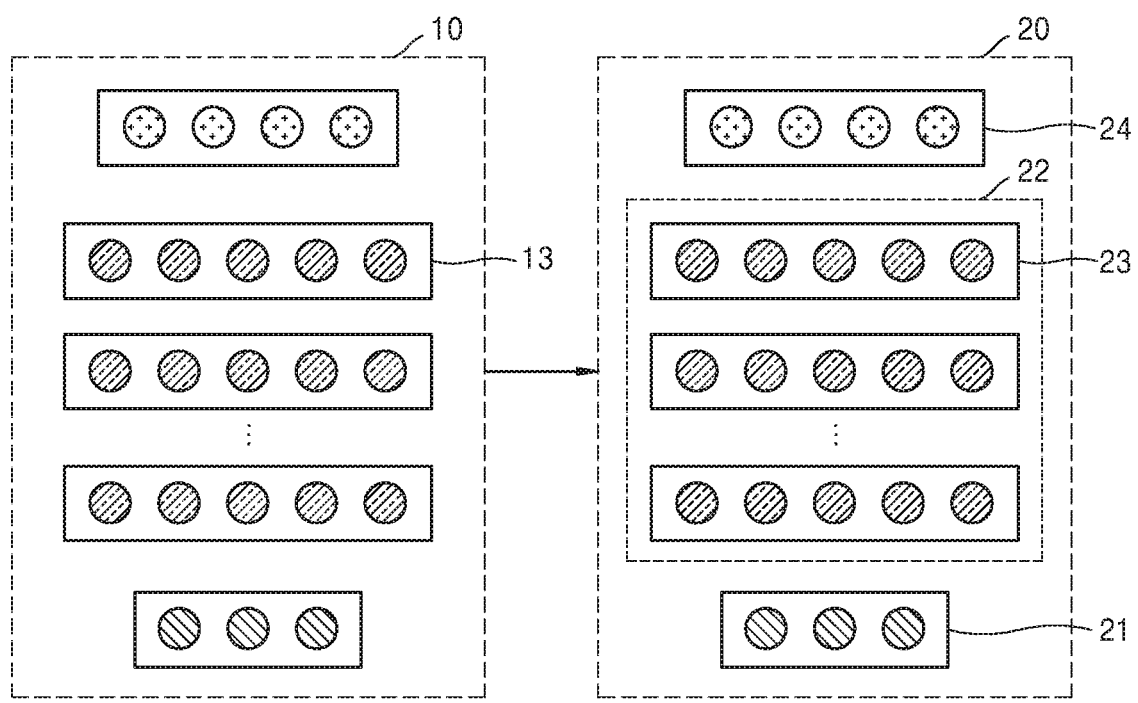
FIG. 5 is a diagram illustrating a process of generating a second neural network according to an embodiment.

FIG. 5 is a diagram illustrating a process of generating the second neural network 20 according to an embodiment.

Referring to FIG. 5, layers and channels constituting the second neural network 20 are shown as a student neural network in which the first neural network 10 is a teacher neural network. As described above, the second neural network 20, as similar to the first neural network 10, may be another example of the neural network 1 of FIG. 2.

The processor 120 may generate the second neural network 20 for identifying a speaker with respect to a voice signal in a noisy environment. The voice signal in the noisy environment may refer to a signal including various noise signals in addition to the voice signal. For example, a noise type of a noise signal may be cafe noise, automobile noise, construction site noise, factory noise, child noise, and may include various other types of noise. Also, the voice signal in the noisy environment may refer to a voice signal having an SNR value that is less than a threshold value.

The second neural network 20 may include an input layer 21, hidden layers 22, and an output layer 24. The second neural network 20 may be a DNN in which the hidden layers 22 are composed of two or more layers. Alternatively, the second neural network 20 may be implemented with other neural network structures, such as a CNN, an RNN, a constrained Boltzmann machine, etc.

A final layer of the hidden layers 22 of the second neural network 20 may be an embedding layer 23. The embedding layer 23 may be a layer located immediately before the output layer 24, and an output of the output layer 24 may be determined based on a second embedding vector indicating an output of the embedding layer 23. The second embedding vector may have activations output from channels included in the embedding layer 23 as components of the second embedding vector. The processor 120 may store data relating to the layers, channels, parameters, and the like, of the second neural network 20 in the memory 110.

The embedding layer 13 of the first neural network 10 and the embedding layer 23 of the second neural network 20 may be generated to include a same size so as to allow the second neural network 20 to be trained according to the teacher-student training model. For example, the number of channels included in the embedding layer 23 may be equal to the number of channels included in the embedding layer 13. The sizes of the first embedding vector and the second embedding vector may be the same based on the size of the embedding layer 13 and the size of the embedding layer 23 being the same, and thus training may be performed such that a distance between the first embedding vector and the second embedding vector is reduced or minimized.

In addition to the size of the embedding layer 13 and the size of the embedding layer 23 being the same, the size of the entire second neural network 20 may be the same as the size of the entire first neural network 10. For example, the processor 120 may generate the second neural network 20 with the same structure as the layers and channels that constitute the first neural network 10.

When the entire sizes of the first neural network 10 and the second neural network 20 are the same, the processor 120 may set a final value of a training parameter of the first neural network 10 to an initial value of a training parameter of the second neural network 20. For example, the processor 120 may set weights between the channels as training parameters of the first neural network 10 of which training is completed and a bias of each of the channels to the initial value of the learning parameter of the second neural network 20. According to the initial value, the second neural network 20 may have a speaker identification ability similar to the first neural network 10, and may further have noise processing ability through additional training.

As described above, the processor 120 may generate the second neural network 20 and selectively initialize the training parameter of the second neural network 20. Then, the processor 120 may generate the speaker identification neural network 30 by training the second neural network 20.

Figure 6:
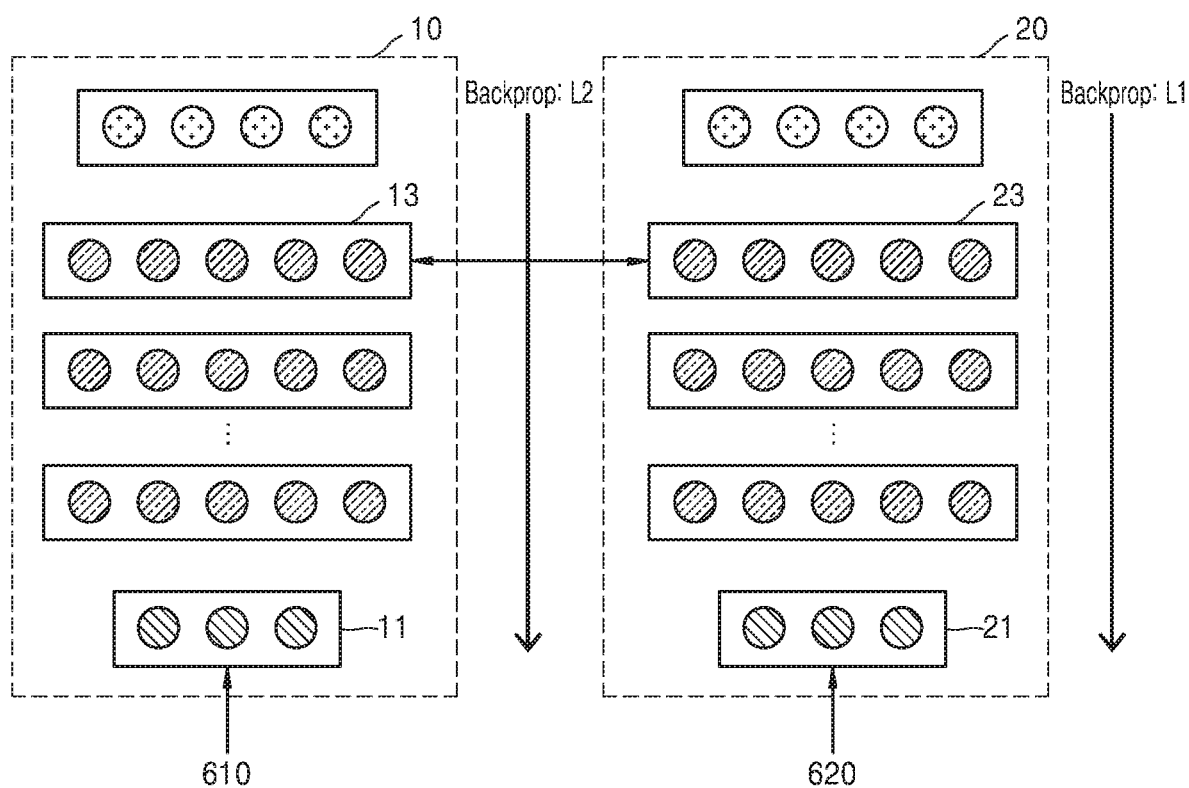
FIG. 6 is a diagram for explaining a process of generating a speaker identification neural network by training a second neural network according to an embodiment.

FIG. 6 is a diagram for explaining a process of generating the speaker identification neural network 30 by training the second neural network 20 according to an embodiment.

Referring to FIG. 6, the processor 120 may train the second neural network 20 according to a teacher-student training model. In the teacher-student training model, the first neural network 10 may be set to a teacher neural network, and the second neural network 20 may be set to a student neural network.

As described above, the first neural network 10 may be trained to identify a speaker with respect to a voice signal of a clean environment according to deep learning or another training method. Thereafter, in a process in which the processor 120 trains the second neural network 20, the first neural network 10 may be maintained in a fixed state without further training, and, accordingly, the first neural network 10 may be a reference for training of the second neural network 20.

The training of the second neural network 20 according to the teacher-student training model may be iteratively performed until each of two targets is achieved. The two targets may be represented as two loss functions. The processor 120 may train the second neural network 20 until a first loss function L1 and a second loss function L2 are minimized as the two loss functions.

The first loss function L1 may be a cross entropy between an output of the second neural network 20 and a training target of the second neural network. The processor 120 may train the second neural network 20 in a direction in which the cross entropy between the output and the training target is minimized. A process in which the second neural network 20 is trained according to the first loss function L1 corresponds to a process in which the first neural network 10 is trained according to the loss function L1 described above with reference to FIG. 4, and thus a description of training of the first neural network 10 of FIG. 4 may be applied to training of the second neural network 20 according to the first loss function L1.

The second loss function L2 may be a distance between the first embedding vector and the second embedding vector derived from a voice signal 610 of the clean environment and a voice signal 620 of the noisy environment that mutually correspond. The processor 120 may generate the speaker identification neural network 30 by training the second neural network 20 such that the distance between the first embedding vector and the second embedding vector is minimized.

The distance between the first embedding vector and the second embedding vector may refer to an extent to which the first embedding vector and the second embedding vector have different values from each other. For example, the distance between the first embedding vector and the second embedding vector may be calculated based on at least one of a mean square error (MSE), a cosine similarity, and a Kullback-Leibler (KL) divergence. However, the present disclosure is not limited thereto, and another index indicating a difference between the first embedding vector and the second embedding vector may be utilized.

The voice signal 610 of the clean environment and the voice signal 620 of the noisy environment that mutually correspond may refer to signals that include the same underlying voice signal, but that correspond to different noise environments. Therefore, when the noise component is removed from the voice signal 620 in the noisy environment, the voice signal 620 in the noisy environment may be substantially similar as the voice signal 610 in the clean environment.

As shown in FIG. 6, the processor 120 may input a feature extracted from the voice signal 610 in the clean environment to the input layer 11 of the first neural network 10, and may input a feature extracted from the voice signal 620 in the noisy environment to the input layer 21 of the second neural network 20. The processor 120 may then calculate the distance between the first embedding vector derived from the voice signal 610 in the clean environment and the second embedding vector derived from the voice signal 620 in the noisy environment, and update the training parameters of the second neural network 20 by performing backpropagation such that the second loss function L2 indicating the distance between the first embedding vector and the second embedding vector is minimized.

When training to minimize the distance between the first embedding vector and the second embedding vector is performed iteratively, the second embedding vector with respect to the voice signal 620 in the noisy environment may be substantially the same as the first embedding vector with respect to the voice signal 610 in the clean environment. The second neural network 20 may also be trained in the clean environment with respect to a signal including noise such that the speaker may be identified at the same level as the first neural network 10 with high speaker identification ability.

As described above, when the initial value of the training parameter of the second neural network 20 is set to the final value of the training parameter of the first neural network 10, the second neural network 20 may inherit the speaker identification performance of the first neural network 10, and may additionally have the voice processing performance by training according to the second loss function L2. As described above, the processor 120 may generate the speaker identification neural network 30 by separately training the speaker identification ability and the noise processing ability of the second neural network 20. Accordingly, when the speaker identification ability and the noise processing ability are implemented as a single training, the time required for training may be reduced, and the model size of a neural network for speaker identification may be reduced.

In FIG. 6, the first loss function L1 and the second loss function L2 are illustrated in two backprojections and the two backprojections are performed independently of each other. However, the first loss function L1 and the second loss function L2 may be represented as a single loss function, and learning may be performed through a single backprojection to minimize the single loss function. This may be expressed as shown in Equation 2 below.

$$L = L_1(O_{student}, O_{target}) + \lambda * L_2(e_{teacher}, e_{student})$$

In Equation 2, L may be the single loss function, $L_1$ may be the first loss function representing the cross entropy between the output $O_{student}$ of the second neural network 20 and the training target $O_{target}$, and $L_2$ may be the second loss function representing the distance between the first embedding vector $e_{teacher}$ and the second embedding vector $e_{student}$. $\lambda$ may be a constant for adjusting a weight with respect to the first loss function $L_1$ and the second loss function $L_2$. The processor 120 may generate the speaker identification neural network 30 by training the second neural network 20 such that the single loss function L is minimized.

Referring again to FIG. 3, the apparatus 100 implementing the speaker identification neural network 30 may utilize the speaker identification neural network 30 to identify a speaker with respect to an input voice signal. As described above, the apparatus 100 for identifying the speaker with respect to the input voice signal by utilizing the speaker identification neural network 30 may be the apparatus 100 implementing the speaker identification neural network 30.

The processor 120 may extract a feature from the input voice signal. The input voice signal may be a voice signal in the noisy environment. The apparatus 100 may include a voice sensor, or the like, to convert a speaker's utterances into the input voice signal. Thereafter, the processor 120 may extract the feature through processing of the input voice signal.

The feature may include any one of fast Fourier transform (FFT) amplitude, FFT power, and log FFT amplitude according to an FFT computation result on the input voice signal. Further, as an indicator relating to a frequency characteristic of the input voice signal, the feature may include at least one of log band energy, mel band energy, and mel frequency cepstral coefficients (MFCC). However, the present disclosure is not limited thereto, and other indicators may be utilized that may be used to identify the speaker with respect to the input voice signal.

The processor 120 may input the feature to the speaker identification neural network 30 to extract an embedding vector corresponding to the feature from the speaker identification neural network 30. The processor 120 may output an embedding vector corresponding to an output of the embedding layer by processing the feature through the speaker identification neural network 30.

The processor 120 may identify the speaker with respect to the input voice signal based on the embedding vector. A specific description in which the speaker with respect to the input voice signal is identified based on the embedding vector may be provided below in more detail with reference to FIG. 7.

FIG. 7 is a diagram illustrating a specific example in which the apparatus 100 for identifying a speaker with respect to an input voice signal operates by utilizing the speaker identification neural network 30 according to an embodiment.

Referring to FIG. 7, a registration process 710 and an identification process 720 performed by the apparatus 100 for identifying the speaker with respect to the input voice signal by utilizing the speaker identification neural network 30 are shown.

In the registration process 710, the processor 120 may store an embedding vector of the speaker identification neural network 30 with respect to a voice signal of a specific speaker in the memory 110 as a registration embedding vector. For example, a speaker A, a speaker B, . . . , and a speaker N may provide utterances corresponding to a plurality of voice signals for registration, and the processor 120 may extract features with respect to the plurality of voice signals and input the features in the speaker identification neural network 30, and may store registration embedding vectors of the speaker A, the speaker B, . . . , the speaker N in the memory 110.

In the identification process 720, the processor 120 may identify whether the input voice signal represents the specific speaker based on a similarity between the embedding vector of the input voice signal and the registration embedding vectors. For example, the processor 120 may compare the embedding vector with respect to the input voice signal with each of the registration embedding vectors of the speaker A, the speaker B, . . . , and the speaker N, and based on the similarity exceeding a reference value, may identify that the input voice signal represents the speaker. When a voice signal of a speaker that is not previously registered is input, the case that the similarity exceeds the reference value may not occur as a result of comparing the similarity, and the processor 120 may identify that there is no pre-registered speaker corresponding to the input voice signal.

The similarity between the embedding vector with respect to the input voice signal and the registration embedding vector may be calculated based on at least one of, for example, cosine similarity and probabilistic linear discriminant analysis (PLDA). However, this is merely an example, and various other indicators that both vectors may represent a similar degree may be utilized without limitation.

Figure 8:
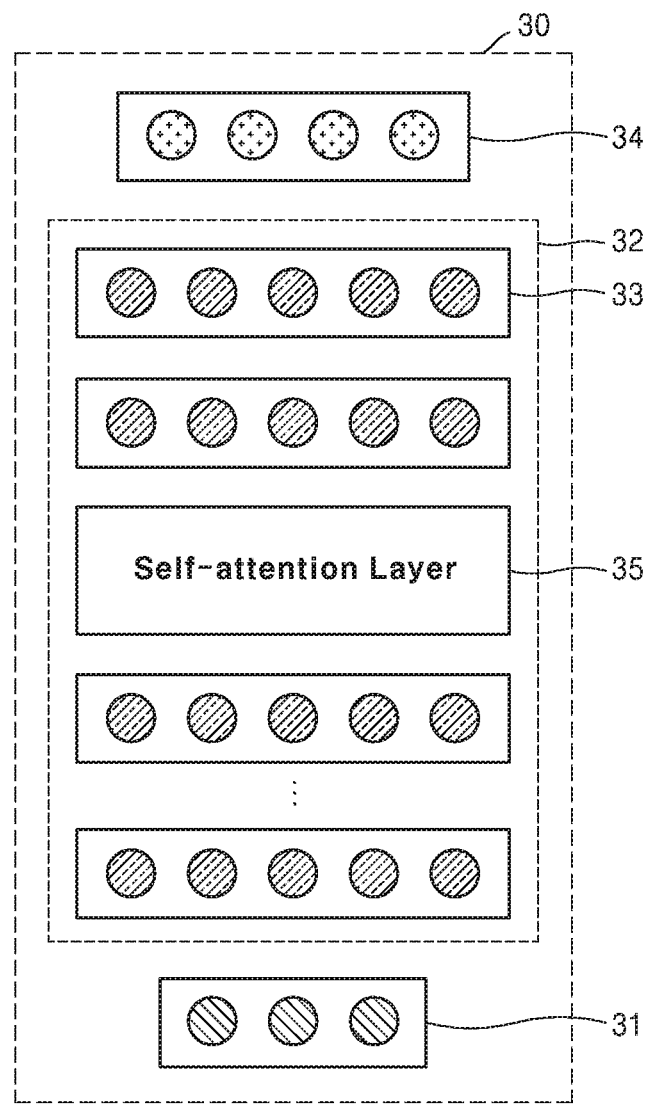
FIG. 8 is a diagram for explaining a process of identifying a speaker with respect to a sentence unit by utilizing a speaker identification neural network according to an embodiment.

FIG. 8 is a diagram for explaining a process of identifying a speaker with respect to a sentence unit by utilizing the speaker identification neural network 30 according to an embodiment.

Referring to FIG. 8, an example of a structure of the speaker identification neural network 30 generated by the apparatus 100 is shown. The speaker identification neural network 30 may be generated by training the second neural network 20, and thus the speaker identification neural network 30 may include the input layer 31, the hidden layers 32, the embedding layer 33, and the output layer 34, as similar to the second neural network 20.

The processor 120 may divide an input voice signal into frame units corresponding to a short time interval and extract an embedding vector of the speaker identification neural network 30 for each frame unit. However, rather than performing embedding vector extraction and speaker identification on a single frame unit corresponding to a voice signal for a short period of time, the processor 120 may group frames constituting one sentence or an utterance unit of a time frame to perform speaker identification in a sentence unit. When speaker identification is performed in the sentence unit, a resultant distortion caused by an outlier having an extreme value may be reduced, and thus accuracy of speaker identification may be improved. Speaker identification in the sentence unit may be performed as follows.

The processor 120 may divide the input voice signal according to a time interval to set a plurality of frames. For example, the processor 120 may divide the input voice signal at a fixed time interval to set a plurality of frames. The fixed time interval may be between several milliseconds and several hundreds of milliseconds, or may be set without limitation depending on the processing ability of the processor 120. Also, a variable time interval other than the fixed time interval may be utilized.

The processor 120 may extract at least a part representing the sentence unit from the plurality of frames to set the part to sentence frames. For example, the processor 120 may set one sentence frame representing one sentence unit from one input voice signal. Alternatively, the processor 120 may set two or more sentence frames representing two or more sentence units from one input voice signal. The processor 120 may distinguish the sentence unit from the input voice signal by distinguishing a voice part of the speaker and a silence part in which noise exists and a voice part does not exist in the input voice signal.

The processor 120 may calculate a sentence embedding vector representing a statistical value with respect to embedding vectors corresponding to the sentence frames. For example, when the sentence frames include 1,000 frames, the processor 120 may extract 1,000 embedding vectors from the 1,000 frames and calculate a statistical value with respect to the 1,000 embedding vectors, thereby deriving the sentence embedding vector. The statistical value with respect to the embedding vectors may be a weighted sum or an average. However, the statistical value may be another value that may provide a statistical result with respect to the embedding vectors.

The processor 120 may identify the speaker with respect to the sentence unit based on the sentence embedding vector. As described above, the processor 120 may calculate the similarity between the sentence embedding vector and the registration embedding vector, thereby permitting identification of the speaker.

The processor 120 may determine a statistical value for calculating the sentence embedding vector using a self-attention method. To this end, a self-attention layer 35 for determining the statistical value using the self-attendance method may be additionally generated in the speaker identification neural network 30. The self-attention layer 35 may be formed at any position different than positions of the input layer 31, the embedding layer 33, and the output layer 34, in addition to a position shown in FIG. 8.

When the self-attention layer 35 is generated, an additional layer corresponding to the self-attention layer 35 may be also generated in the first neural network 10 and the second neural network 20. The processor 120 may train the second neural network 20 according to a teacher-student training model, and thus the speaker identification neural network 30 including the self-interest layer 35 may be generated.

The self-attention layer 35 may calculate the sentence embedding vector by determining the statistical value with respect to the embedding vectors corresponding to the sentence frames using the self-attention method. For example, when the statistical value with respect to the embedding vectors corresponding to the sentence frames is the weighted sum, the self-attention layer 35 may calculate weights of the weighted sum.

Specifically, the self-attention layer 35 may assign a high weight to an embedding vector of a period in which a voice signal exists, among the embedding vectors corresponding to the sentence frames, and may assign a low weight to an embedding vector of a period in which noise signals exists and a voice signal does not exist. By the above operation of the self-attention layer 35, the speaker recognition neural network 30 may distinguish a voice period and a voice-free noise period without performing separate voice preprocessing or voice activity detection (VAD), thereby improving accuracy of speaker recognition.

FIG. 9 is a diagram illustrating tables 910, 920, and 930 for explaining performance used to identify a speaker with respect to an input voice signal through the speaker identification neural network 30 according to an embodiment.

Referring to FIG. 9, the table 910 shows data for generating the speaker identification neural network 30, the table 920 shows data for testing speaker identification performance using the speaker identification neural network 30, and the table 930 shows a speaker identification result over the speaker identification neural network 30.

In the table 910, the speaker identification neural network 30 may be generated using training data corresponding to voice data of 160 speakers. The processor 120 may utilize the training data of the table 910 to train the second neural network 20 according to a teacher-student training model, thereby generating the speaker identification neural network 30. Each of the 160 speakers may generate 100 voice signals, and provide the 100 voice signals as training data. The provided training data may be a voice signal in a noisy environment having a signal-to-noise ratio (SNR) of −5 to 20 dB and a voice signal in a clean environment having an SNR of 30 dB. Noise types may be café noise, car noise, construction site noise, factory noise, child noise, etc.

In the table 920, the testing data for testing the speaker identification neural network 30 may be voice signals of 40 speakers and a voice signal in the noisy environment having an SNR of 5 dB, and may be a noise type of car or babble. The data for testing may be 60*40 voice signals including 60 target attempts.

In the table 930, performance to identify a speaker with respect to an input voice signal by utilizing the speaker identification neural network 30 is proposed through an equal error rate (EER). The EER may refer to an error rate when a false acceptance rate (FAR) and a false rejection rate (FRR) are identical. A column 931 may identify a case where training is performed on the voice signal in the clean environment. A column 932 may identify a case where training is performed on the voice signal in the noisy environment. A column 933 may identify a case where training is performed according to the teacher-student training model. With respect to a clean voice signal, it is shown that accuracy of the column 931 is the highest, and it may be shown that accuracy of the column 933 is also similar to the accuracy of the column 931. Also, in all four types of proposed voice signals, it may be shown that the accuracy of column 933 is higher than the accuracy of the column 932.

Based on comparing the column 932 and the column 933, which may identify the speaker with respect to the voice signal in the noisy environment, and as shown in the table 930, it may be shown that the EER may be relatively lower in the case of the column 933 in which training is performed by distinguishing a speaker identification ability and a noise processing ability according to the teacher-student training model and that the speaker identification performance may be relatively higher as compared to the case of the column 932 in which training is performed on the voice signal in the noisy environment without applying the teacher-student training model.

Figure 10:
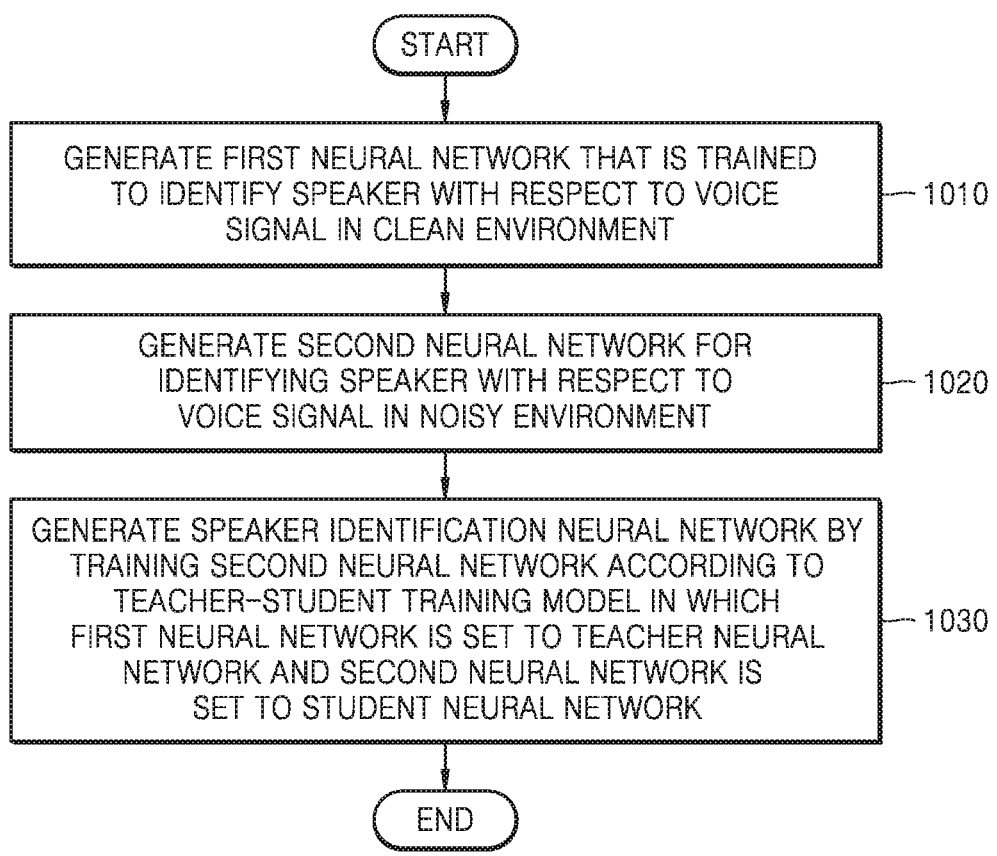
FIG. 10 is a flowchart illustrating operations constituting a method of implementing a speaker identification neural network according to an embodiment.

FIG. 10 is a flowchart illustrating operations constituting a method of implementing the speaker identification neural network 30 according to an embodiment.

Referring to FIG. 10, the method of implementing the speaker identification neural network 30 may include operations 1010 through 1030. However, the present disclosure is not limited thereto, and other operations besides the operations shown in FIG. 10 may be further included in the method of implementing the speaker identification neural network 30.

The method of implementing the speaker identification neural network 30 of FIG. 10 may include operations that are processed serially by the apparatus 100 for implementing the speaker identification neural network 30 described with reference to FIGS. 1 through 9. Therefore, even though the method of FIG. 10 is omitted in the following description, the description of the apparatus 100 of FIGS. 1 to 9 may also be applied to the method of FIG. 10.

In operation 1010, the apparatus 100 may generate the first neural network 10 that is trained to identify a speaker with respect to a voice signal in a clean environment.

The apparatus 100 may generate the first neural network 10 that is trained to identify the speaker with respect to the voice signal in the clean environment based on a first embedding vector representing an output of a final layer constituting the first neural network 10.

The apparatus 100 may generate the first neural network 10 by training the first neural network 10 such that a cross entropy between a training target of the first neural network 10 and the output of the first neural network 10 is minimized.

In operation 1020, the apparatus 100 may generate the second neural network 20 for identifying a speaker with respect to a voice signal in a noisy environment.

The apparatus 100 may generate the second neural network 20 for identifying the speaker with respect to the voice signal in the noisy environment based on an output of a final layer constituting the second neural network 20.

The apparatus 100 may train the second neural network 20 such that a cross entropy between a training target of the second neural network 20 and an output of the second neural network 20 is minimized.

The apparatus 100 may generate the second neural network 20 so as to have the same number of layers and nodes as the number of layers and nodes constituting the first neural network 10.

In operation 1030, the apparatus 100 may generate the speaker identification neural network 30 by training the second neural network 20 according to a teacher-student training model in which the first neural network 10 is set as a teacher neural network and the second neural network 20 is set as a student neural network.

The apparatus 100 may train the second neural network 20 such that a distance between a first embedding vector and a second embedding vector derived from the voice signal in the clean environment and the voice signal in the noisy environment that mutually correspond is minimized.

The distance between the first embedding vector and the second embedding vector may be calculated based on at least one of an MSE, a cosine similarity, and a KL divergence.

The apparatus 100 may train the second neural network 20 by setting a final value of a training parameter of the first neural network 10 to an initial value of a training parameter of the second neural network 20.

Figure 11:
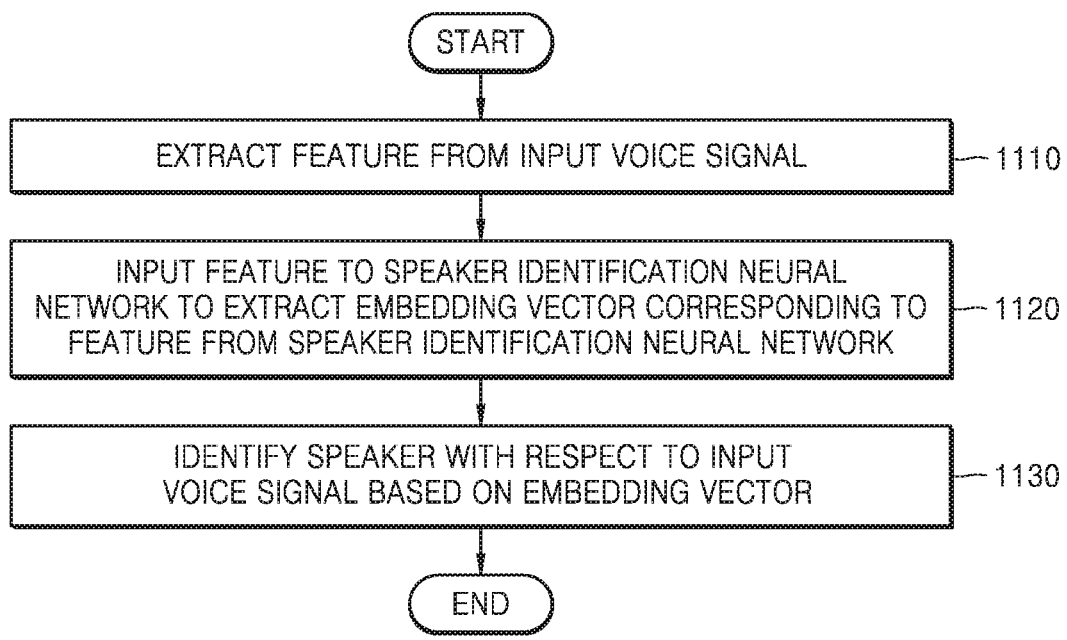
FIG. 11 is a flowchart illustrating operations constituting a method of identifying a speaker with respect to an input voice signal by utilizing a speaker identification neural network according to an embodiment.

FIG. 11 is a flowchart illustrating operations constituting a method of identifying a speaker with respect to an input voice signal by utilizing the speaker identification neural network 30 according to an embodiment.

Referring to FIG. 11, the method of identifying the speaker with respect to the input voice signal by utilizing the speaker identification neural network 30 may include operations 1110 through 1130. However, the present disclosure is not limited thereto, and other operations besides the operations shown in FIG. 11 may further be included in the method of identifying the speaker with respect to the input voice signal by utilizing the speaker identification neural network 30.

The method of identifying the speaker with respect to the input voice signal by utilizing the speaker identification neural network 30 of FIG. 11 may include operations that are processed serially by the apparatus 100 for identifying the speaker with respect to the input voice signal by utilizing the speaker identification neural network 30 described with reference to FIGS. 1 through 9. Therefore, even though the method of FIG. 11 is omitted in the following description, the description of the apparatus 100 of FIGS. 1 to 9 may also be applied to the method of FIG. 11.

In operation 1110, the apparatus 100 may extract a feature from the input voice signal.

The feature may include at least one of FFT amplitude, FFT power, and log FFT amplitude according to a result of FFT computation with respect to the input voice signal, log band energy, mel band energy, and MFCC of the input voice signal.

In operation 1120, the apparatus 100 may input the feature into the speaker identification neural network 30 to extract an embedding vector corresponding to the feature from the speaker identification neural network 30.

In operation 1130, the apparatus 100 may identify the speaker with respect to the input voice signal based on the embedding vector.

The apparatus 100 may store the embedding vector of the speaker identification neural network 30 with respect to a voice signal of a specific speaker as a registration embedding vector in the memory 110 and may identify whether the input voice signal represents the specific speaker based on similarity between the embedding vector with respect to the input voice signal and the registration embedding vector.

The similarity between the embedding vector with respect to the input voice signal and the registration embedding vector may be calculated based on at least one of cosine similarity and PLDA.

The apparatus 100 may set a plurality of frames by dividing the input voice signal according to a time interval, extract at least some frames representing a sentence unit from the plurality of frames to set the extracted frames as sentence frames, calculate a sentence embedding vector indicating a statistic value with respect to embedding vectors corresponding to the sentence frames, and identify a speaker with respect to the sentence unit based on the sentence embedding vector.

A self-attention layer for determining the statistical value in a self-attendance method may be additionally generated in the speaker identification neural network 30.

The method of implementing the speaker identification neural network 30 of FIG. 10 and the method of identifying the speaker with respect to the input voice signal by utilizing the speaker identification neural network 30 of FIG. 11 may be stored on a non-transitory computer-readable medium on which one or more programs and instructions for implementing the method are stored.

Examples of the computer-readable medium include magnetic media such as hard disk, floppy disk, and magnetic tape, optical media such as CD-ROM and DVD, magneto-optical media such as floptical disk, and hardware devices specifically configured to store and execute program instructions such as ROM, RAM, flash memory, and the like. Examples of program instructions may include machine language code such as those produced by a compiler, as well as high-level language code that may be executed by a computer using an interpreter, or the like.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of generating a speaker identification neural network, the method comprising:
   generating a first neural network that is trained to identify a first speaker with respect to a first voice signal in a first environment in which a first signal-to-noise (SNR) value of the first voice signal is greater than or equal to a threshold value, wherein the first neural network is configured to set sentence frames by distinguishing a voice part of the first speaker and a silence part in which only noise exists without voice in the first voice signal, and receive the sentence frames of the first voice signal as an input of the first neural network, and identify the first speaker based on a first sentence embedding vector representing a weighted sum of first embedding vectors that are output from a last hidden layer of the first neural network that is provided immediately before an output layer of the first neural network;
   generating a second neural network for identifying a second speaker with respect to a second voice signal in a second environment in which a second SNR value of the second voice signal is less than the threshold value, wherein the second neural network is configured to set sentence frames by distinguishing a voice part of the second speaker and a silence part in which only noise exists without voice in the second voice signal, and receive the sentence frames of the second voice signal as an input of the second neural network, and identify the second speaker based on a second sentence embedding vector indicating a weighted sum of second embedding vectors that are output from a last hidden layer of the second neural network that is provided immediately before an output layer of the second neural network; and
   generating the speaker identification neural network by training the second neural network based on a teacher-student training model in which the first neural network is set to a teacher neural network and the second neural network is set to a student neural network,
   wherein the speaker identification neural network comprises an attention layer to adjust the initial weights of the second neural network such that a relatively high weight is assigned to an embedding vector of a period in which a voice signal exists, and a relative low weight is assigned to an embedding vector of a period in which a noise signal exists and any voice signal does not exist, among the second embedding vectors.

2. The method of claim 1, wherein the first neural network comprises a first embedding layer and the second neural network comprises a second embedding layer, and
   wherein a number of channels included in the first embedding layer of the first neural network is equal to a number of channels included in the second embedding layer of the second neural network to allow the second neural network to be trained according to the teacher-student training model.

3. The method of claim 1, wherein the generating of the speaker identification neural network comprises training the second neural network such that a distance between the first sentence embedding vector and the second sentence embedding vector derived from the first voice signal in the first environment and the second voice signal in the second environment that mutually correspond is minimized.

4. The method of claim 3, wherein the distance between the first sentence embedding vector and the second sentence embedding vector is calculated based on at least one of a mean square error (MSE), a cosine similarity, and a Kullback-Leibler divergence.

5. The method of claim 1, wherein the generating of the first neural network comprises generating the first neural network by training the first neural network such that a first cross entropy between a first training target of the first neural network and a third output of the first neural network is minimized, and
   wherein the generating of the speaker identification neural network comprises training the second neural network such that a second cross entropy between a second training target of the second neural network and a fourth output of the second neural network is minimized.

6. The method of claim 1, wherein the generating of the second neural network comprises generating the second neural network to have the same number of layers and nodes as the number of layers and nodes of the first neural network.

7. The method of claim 1, wherein the second neural network is generated using weights and biases of the first neural network of which training is completed, as initial weights and initial biases of the second neural network, and is trained to adjust the initial weights and initial biases of the second neural network in a direction in which the second sentence embedding vector output from the last hidden layer of the second neural network becomes closer to the first sentence embedding vector output from the last hidden layer of the first neural network.

8. An apparatus for generating a speaker identification neural network, the apparatus comprising:
   a memory storing at least one program; and
   a processor configured to execute the at least one program to:
   generate a first neural network that is trained to identify a first speaker with respect to a first voice signal in a first environment in which a first signal-to-noise (SNR) value of the first voice signal is greater than or equal to a threshold value, wherein the first neural network is configured to set sentence frames by distinguishing a voice part of the first speaker and a silence part in which only noise exists without voice in the first voice signal, and receive the sentence frames of the first voice signal as an input of the first neural network, and identify the first speaker based on a first sentence embedding vector representing a weighted sum of first embedding vectors that are output from a last hidden layer of the first neural network that is provided immediately before an output layer of the first neural network;
   generate a second neural network for identifying a second speaker with respect to a second voice signal in a second environment in which a second SNR value of the second voice signal is less than the threshold value, wherein the second neural network is configured to set sentence frames by distinguishing a voice part of the second speaker and a silence part in which only noise exists without voice in the second voice signal, and receive the sentence frames of the second voice signal as an input of the second neural network, and identify the second speaker based on a second sentence embedding vector indicating a weighted sum of second embedding vectors that are output from a last hidden layer of the second neural network that is provided immediately before an output layer of the second neural network; and generate the speaker identification neural network by training the second neural network based on a teacher-student training model in which the first neural network is set to a teacher neural network and the second neural network is set to a student neural network, wherein the speaker identification neural network comprises an attention layer to adjust the initial weights of the second neural network such that a relatively high weight is assigned to an embedding vector of a period in which a voice signal exists, and a relative low weight is assigned to an embedding vector of a period in which a noise signal exists and any voice signal does not exist, among the second embedding vectors.

9. The apparatus of claim 8, wherein the processor is further configured to:

train the second neural network such that a distance between the first sentence embedding vector and the second sentence embedding vector derived from the first voice signal in the first environment and the second voice signal in the second environment that mutually correspond is minimized.

10. The apparatus of claim 9, wherein the distance between the first sentence embedding vector and the second sentence embedding vector is calculated based on at least one of a mean square error (MSE), a cosine similarity, and a Kullback-Leibler divergence.

11. The apparatus of claim 8, wherein the processor is further configured to generate the first neural network by training the first neural network such that a first cross entropy between a first training target of the first neural network and a third output of the first neural network is minimized; and train the second neural network such that a second cross entropy between a second training target of the second neural network and a fourth output of the second neural network is minimized.

12. The apparatus of claim 8, wherein the processor is further configured to:

generate the second neural network to have the same number of layers and nodes as the number of layers and nodes of the first neural network.

13. The apparatus of claim 12, wherein the processor is further configured to:

train the second neural network by setting a final value of a first training parameter of the first neural network to an initial value of a second training parameter of the second neural network.

14. An apparatus for identifying a speaker with respect to an input voice signal by utilizing a speaker identification neural network, the apparatus comprising:

a memory storing at least one program; and
a processor configured to:
extract a feature from the input voice signal;
input the feature to the speaker identification neural network that is generated by training a second neural network according to a teacher-student training model in which a first neural network is set to a teacher neural network and the second neural network is set to a student neural network, wherein the first neural network is trained to set sentence frames by distinguishing a voice part of the first speaker and a silence part in which only noise exists without voice in the first voice signal, and receive the sentence frames of the first voice signal as an input of the first neural network, and identify a first speaker with respect to a first voice signal in a first environment in which a first signal-to-noise (SNR) value of the first voice signal is greater than or equal to a threshold value, based on a first sentence embedding vector representing a weighted sum of first embedding vectors that are output from a last hidden layer of the first neural network that is provided immediately before an output layer of the first neural network; and wherein the second neural network is trained to set sentence frames by distinguishing a voice part of the second speaker and a silence part in which only noise exists without voice in the second voice signal, and receive the sentence frames of the second voice signal as an input of the second neural network, and identify a second speaker with respect to a second voice signal in a second environment in which a second SNR value of the second voice signal is less than the threshold value, based on a second sentence embedding vector indicating a weighted sum of second embedding vectors that are output from a last hidden layer of the second neural network that is provided immediately before an output layer of the second neural network;

extract the second sentence embedding vector corresponding to the feature from the speaker identification neural network; and identify the speaker with respect to the input voice signal based on the second sentence embedding vector, wherein the speaker identification neural network comprises an attention layer to adjust the initial weights of the second neural network such that a relatively high weight is assigned to an embedding vector of a period in which a voice signal exists, and a relative low weight is assigned to an embedding vector of a period in which a noise signal exists and any voice signal does not exist, among the second embedding vectors.

15. The apparatus of claim 14, wherein the feature comprises at least one of a fast Fourier transform (FFT) amplitude, an FFT power, a log FFT amplitude, a log band energy, a mel band energy, and a mel frequency cepstral coefficients (MFCC) of the input voice signal.

16. The apparatus of claim 14, wherein the processor is further configured to:

store the first sentence embedding vector of the speaker identification neural network with respect to a voice signal of a specific speaker in the memory as a registration embedding vector; and identify whether the input voice signal represents the specific speaker based on a similarity between the second sentence embedding vector of the input voice signal and the registration embedding vector.

17. The apparatus of claim 16, wherein the similarity between the second sentence embedding vector with respect to the input voice signal and the registration embedding vector is calculated based on at least one of a cosine similarity and a probabilistic linear discriminant analysis (PLDA).

* * * * *